United States Patent [19]
Garcia et al.

[11] Patent Number: 5,854,304
[45] Date of Patent: Dec. 29, 1998

[54] DEGRADABLE/COMPOSTABLE CONCENTRATES, PROCESS FOR MAKING DEGRADABLE/COMPOSTABLE PACKAGING MATERIALS AND THE PRODUCTS THEREOF

[75] Inventors: Rodrigo A. Garcia, Montgomery, Tex.; Joseph Gock Gho, Vancouver, Canada

[73] Assignee: EPI Environmental Products Inc., Conroe, Tex.

[21] Appl. No.: 900,217

[22] Filed: Jul. 24, 1997

Related U.S. Application Data

[63] Continuation of Ser. No. 355,989, Dec. 14, 1994, abandoned.

[51] Int. Cl.$^6$ .............................. C08K 5/09; C08K 5/098; C08K 3/22; C08J 3/20
[52] U.S. Cl. ................. 523/124; 523/125; 523/126; 523/351; 524/320; 524/321; 524/398; 524/433; 428/308.4; 428/339; 521/79
[58] Field of Search .................... 523/124, 125, 523/126, 351; 524/320, 321, 398, 433; 428/308.4; 521/79

[56] References Cited

U.S. PATENT DOCUMENTS

| | | | |
|---|---|---|---|
| 3,840,512 | 10/1974 | Brackman | 260/94.9 |
| 3,994,855 | 11/1976 | Boberg | 523/126 |
| 4,101,720 | 7/1978 | Taylor et al. | 526/3 |
| 4,156,666 | 5/1979 | Odate et al. | 260/23 |
| 4,219,453 | 8/1980 | Sakurai et al. | 524/320 |
| 4,256,851 | 3/1981 | Taylor et al. | 525/1 |
| 4,345,046 | 8/1982 | Ejk et al. | 524/320 |
| 4,517,318 | 5/1985 | Miyoshi et al. | 523/12 |
| 4,997,612 | 3/1991 | Gianchandai et al. | 524/394 |
| 5,096,940 | 3/1992 | Mor | 524/125 |
| 5,137,956 | 8/1992 | Trivett | 524/320 |
| 5,212,219 | 5/1993 | Griffin | 524/47 |
| 5,212,223 | 5/1993 | Mack et al. | 524/318 |
| 5,216,043 | 6/1993 | Sipinen et al. | 523/126 |
| 5,258,422 | 11/1993 | Chang et al. | 523/124 |
| 5,300,549 | 4/1994 | Ward et al. | 524/521 |
| 5,378,747 | 1/1995 | Das et al. | 524/320 |
| 5,384,183 | 1/1995 | Taylor | 524/398 |
| 5,416,133 | 5/1995 | Garcia et al. | 523/124 |

FOREIGN PATENT DOCUMENTS 0011533  1/1983  Japan .

OTHER PUBLICATIONS

Degradable Materials: Perspectives, Issues 6 Opportunities, "Introduction" Ranaui Narayam, pp. 1–10.
Garbage, Marhune 1990, "Degradable Plastics", John Donnelly, pp. 42–45.

*Primary Examiner*—Tae Yoon
*Attorney, Agent, or Firm*—Mary J. Gaskin

[57] ABSTRACT

The present invention is directed to an additive degradable/compostable package, the combination of a metal carboxylate and an aliphatic poly hydroxy-carboxyl acids, which is added to polyolefin resins in the production of specific products. The addition of the additive degradable/compostable package produces a packaging product which is degradable/compostable. The additive package may include calcium oxide (CaO) to make the modified polyolefin resin more processable. Further, stabilizers or oxidizers may be added to the additive package. The additive package is specifically modified or tailored to the application of the packaging product, e.g. trash bag, compost bag, merchant bag, diaper liner, wrapping film, agricultural film, landfill cover or foamed planks. The present invention further includes the method or process of producing the degradable/compostable concentrates and the improvement of the process of making the degradable/compostable packaging products by the addition of calcium oxide (CaO).

26 Claims, No Drawings

DEGRADABLE/COMPOSTABLE CONCENTRATES, PROCESS FOR MAKING DEGRADABLE/COMPOSTABLE PACKAGING MATERIALS AND THE PRODUCTS THEREOF

This application is a continuation of application Ser. No. 08/355,989 filed on Dec. 14, 1994, now abandoned.

FIELD OF THE INVENTION

The present invention is directed to chemically degradable/compostable additive packages or concentrates which are added to polyolefins used in making packaging materials, primarily films and planks or sheets, and making these packaging materials degradable/compostable. The present invention is further directed to the method or process of producing the chemically degradable/compostable concentrates and the process of producing the degradable/compostable packaging materials.

BACKGROUND OF THE INVENTION

U.S. Pat. No. 3,840,512 discloses thermoplastic compositions which contain a metal salt of a fatty acid and a free carboxylic acid. The presence of the acid, benzoic (an aromatic acid) or pelargonic, lauric, stearic, oleic, linoleic or behenic (all fatty acids), in the compression molded films exhibited shorter times until the film became embrittled when exposed to a number of sun lamps and black lamps than a film containing only the metal prodegradant.

U.S. Pat. No. 4,101,720 discloses a degradable plastic composition consisting of an organic polymeric material having dispersed therein at least one organic derivative of a transition metal and at least one readily autoxidizable organic material.

U.S. Pat. No. 4,156,666 discloses degradable polyolefin resin compositions comprising a polyolefin, about 0.2 to 10% by weight of a fatty acid or esters of fatty acids with monohydric aliphatic alcohols and optionally, about 10 to 60% by weight of an inorganic filler such as calcium carbonate. These resins are clearly characterized as molding resins and the acid or esters are promoters for photodegradability. The degradation of the molding resins disclosed requires exposure to sunlight for degradation to occur.

U.S. Pat. No. 4,256,851 discloses an environmentally degradable plastic composition comprising an organic polymeric material having dispersed therein at least one ethylenically unsaturated alcohol or ethylenically unsaturated ester derived therefrom as a readily autoxidizable organic substance.

U.S. Pat. No. 4,517,318 discloses a photo-degradable styrene resin composition which comprises a styrene resin and at least one photo-degradable agent selected from the group consisting of benzophenone, anthraquinone, fluorenone, xanthone, phenylalkyl ketones, phenacyl halides and derivatives of these compounds, and optionally at least one photo-degradable accelerator.

U.S. Pat. No. 5,096,940 discloses an organic polymeric material having dispersed therein a degradation-controlling amount of an additive system consisting essentially of at least one alkoxylated ethylenically saturated compound as photosensitizer/readily auto-oxidizable additive and, optionally, at least one other readily auto-oxidizable organic substance.

U.S. Pat. No. 5,258,422 disclose compostable and biodegradable thermoplastic compositions comprising a thermoplastic polymer, a hydrolytically unstable antioxidant, a pro-oxidant, an accelerator, and a property modifier.

It is well documented that the first issue regarding degradable plastics is the definition of "degradable". The classification of environmentally degradable materials was made by R. Narayan of Michigan Biotechnology Institute in "Degradable Materials: Perspectives, Issues and Opportunities", pg.1, CRC Press, 1990, as "biodegradable, photodegradable and chemically degradable." The question was posed: "Are they (degradable plastics) a delusion, a solution or a downright hoax?" in an article by John Donnelly, "Degradable Plastics", *Garbage*, May/June 1990. As described in the article, the first attempts at producing a degradable polyolefin film, trash bags for example, was to add materials such as starch or sugar which made the plastic more biodegradable or to add materials such as metals which made the plastic more photodegradable. However, each of these materials had to contain an additive which was dependent on the environment to which the plastic was exposed for degradation to occur; for example the presence of starch or sugar was necessary for the biodegradable reaction with the bacteria to occur or the presence of a photo-prodegradant was necessary for the photodegradable reaction to occur in the presence of sunlight or ultraviolet exposure. The thermoplastic was only "degradable" when the plastic was in a specific environment but otherwise there was no evidence of degradation in any reasonable time; thus, the biodegradable plastic which was intended to biodegrade in a landfill or a composting operation did not degrade when blown into a ditch at the side of the road or a photodegradable plastic was not photodegradable when collected with the trash and buried in a landfill. Those which were said to be chemically degradable had no processability to produce useful products.

The present invention is directed to a combination of additives which when added to polyolefin thermoplastic during the production of a packaging material will produce a "degradable/compostable" packaging product. The term "degradable/compostable" is used herein to denote the significant difference between the products of the present invention which are both photodegradable and chemically degradable, thus truly environmentally degradable under most conditions, and those commercial compositions which are degradable only under one particular environment, such as photodegradable or biodegradable. The compounding of the additives of the present invention into concentrates which are added to polyolefin resins during the processing of the thermoplastic into the desired end use product, e.g. trash bag, compost bag, merchant bag, diaper liner, incontinence pad, wrapping film, agricultural film, twine or foamed packaging planks or sheets, will produce a plastic product which is environmentally degradable. The triggered degradation which occurs with the additive packages of the present invention are controlled by the selection of polyolefin, the specific additives and the concentration of the additives. The degradation is molecular, meaning that the triggered degradation results in a molecular weight reduction of the polyolefin. The degradation is accelerated by heat and/or ultraviolet (UV) light. In addition, the plastic product will degrade without sunlight, and even under anaerobic conditions, when heated to temperatures found in landfills and composting operations.

SUMMARY OF THE INVENTION

The present invention is directed to an additive degradable/compostable package, the combination of a metal carboxylate and an aliphatic poly hydroxy-carboxyl acids, which is added to polyolefin resins in the production of specific products. The addition of the additive degradable/compostable package produces a packaging product which is degradable/compostable. The additive package may include calcium oxide (CaO) to make the modified polyolefin resin more processable. Further, stabilizers or oxidizers may be added to the additive package. The additive package is specifically modified or tailored to the application of the packaging product, e.g. trash bag, compost bag, wrapping film, agricultural film, landfill cover or packaging planks. The present invention further includes the method or process of producing the degradable/compostable concentrates and the improvement of the process of making the degradable/compostable packaging products by the addition of calcium oxide (CaO).

BRIEF DESCRIPTION OF THE PREFERRED EMBODIMENTS

The present invention cannot be fully understood without stopping and considering that the essence of the invention is directly contrary to the current practices of the industry. This statement is not meant to say that others have not disclosed attempts to produce degradable thermoplastics and thermoplastic products. It is simply to recognize that the practice of the industry is not to use additives or concentrates containing compounds which will reduce the properties of the thermoplastic in its intended use nor use additives which detract from the processability of the polyolefin in the specific process for making the desired end product. The additives of the present invention are unique in that the first impression negatives are overcome and degradable/compostable products which are industry acceptable are able to be produced.

The present invention is directed to an degradable/compostable additive packages for adding to polyolefin resins used in the manufacture of packaging materials to make the specific packaging product degradable/compostable. The additive packages of the present invention are tailored for a specific packaging product produced with a specific polyolefin resin. The additive packages of the present invention are a combination of a metal carboxylate and an aliphatic poly hydroxy-carboxyl acid.

The preferred metal carboxylates are cobalt, cerium and iron stearate. Other suitable metal carboxylates are carboxylates containing aluminum, antimony, barium, bismuth, cadmium, chromium, copper, gallium, lanthanum, lead, lithium, magnesium, mercury, molybdenum, nickel, potassium, rare earths, silver, sodium, strontium, tin, tungsten, vanadium, yttrium, zinc or zirconium.

An aliphatic poly hydroxy-carboxyl acid is defined for the purpose of this invention as an aliphatic acid having either more than one hydroxy (—OH) or more than one carboxyl (—COOH) group in the organic acid. The aliphatic poly hydroxy-carboxyl acids are illustrated by the aliphatic, dihydroxy, monocarboxyl acids, such as glyoxylic acid and glyceric acid; the aliphatic, polyhydroxy, monocarboxyl acids, such as erythric acid, arabic acid or mannitic acid; the aliphatic, monohydric, dicarboxyl acids, such as tartronic acid or malic acid; the aliphatic, dihyroxy, dicarboxyl acids, such as tartaric acid; the aliphatic, polyhydroxy, dicarboxyl acids, such as trihydroxyglutaric acid and succharic acid; and the aliphatic, monohydroxy, tricarboxyl acids, such as citric acid.

The additive packages of the present invention include a combination of the metal carboxylates, an aliphatic poly hydroxy-carboxyl acid, Calcium oxide and a variety of other compounds may be included in the packages. The packages may include a mixture of pellets of a separate concentrate of the metal carboxylate and a separate concentrate of the aliphatic poly hydroxy-carboxyl acid (a salt and pepper blend) or pellets of a single concentrate containing both the metal and the acid or other combinations of metals, acids, stabilizer, oxidizer and calcium oxide in a single or multiple pellet concentrate.

The process for producing the additive concentrates, one aspect of the present invention, includes thoroughly drying the additive(s); selecting a suitable carrier in which the additive(s) are concentrated; and producing a concentrate in an extruder where the exit zone temperature of the extruder is less than about 300° F., before the strands are pelletized. The metal carboxylates and aliphatic poly hydroxy-carboxyl acids are handled to make certain that water is not present during the processing of these materials. All additives may be first dried. Any additive which has a propensity to be hydrophilic (absorbs water), such as the aliphatic poly hydroxy-carboxyl acids, is coated with glycerol monostearate, glycerol tristearate or pentaerythritol tetrastearate in a mixer. The additive (or treated additive) is introduced to a vented extruder with a carrier. The preferred carriers are low melting, low density polyolefins. Suitable carrier resins are Dow Chemical's—ENGAGE SM 8400—an ethylene copolymer having a melting point of about 129° F.; Eastman Chemical's—1924—a low density polyethylene homopolymer (LDPE) having a melting point of about 201° F.; Exxon Chemical's—ATX325—an ethylene-acrylic acid copolymer having a melting point of about 149° F.; Exxon Chemical's—ESCORENE LD724—an ethylene-vinyl acetate copolymer having a melting point of about 183° F.; Exxon Chemical's—EXACT 4023—an ethylene-butene copolymer having a melting point of about 154° F.; Exxon Chemical's—OPTEMA TC140—an ethylene-methyl acrylate copolymer having a melting point of about 162° F.; Exxon Chemical's—509—a low density polyethylene homopolymer having a melting point of about 183° F.; and other polyolefins having a melting point less than 250° F. The temperature profile of the extruder is maintained as low as possible and the temperature of the last zone of the extruder is preferably lower than 300° F., preferably 250° to 270° F.

Thermoplastic resins which may be modified by the additive packages of the present invention to make the thermoplastic degradable/compostable products of the present invention include low density polyethylene (LDPE), linear low density polyethylene (LLDPE), very low density polyethylene (VLDPE), high density polyethylene (HDPE), polypropylene (PP), any of the copolymers of ethylene, propylene and other monomers such as butene, pentene or hexene or octene, copolymers such as polyethylene acrylic acid (EAR), polyethylene vinyl acetate (EVA) and polyethylene methacrylic acid (EMA), the ethylene-based copolymers neutralized with metal salts (forming ionic clusters and known as ionomers) and polybutylene and its related copolymers. All these polyolefin resins may be used as the thermoplastic resin to produce a chemically degradable/compostable product. Suitable resins for producing a degradable/compostable film are Chevron Chemical—5272—an ethylene-vinyl acetate copolymer having a 0.928 density and 1.3 MI; Dow Chemical—Dowlex 2045—an ethylene octene copolymer having a 0.928 density and 1.0 MI; Eastman Chemical—1924—an ethylene homopolymer having a density of 0.923 and a 4.2 MI; Exxon Chemical—3001—a low density polyethylene homopolymer having a density of 0.928 and 1.0 MI; Exxon Chemical—Optema TC—an ethylene methyl acrylate copolymer having a density of 0.938 and 0.7 MI; Exxon Chemical—Escorene LD730—an ethylene vinyl acetate copolymer having a density of 0.938 and 0.7 MI; Himont Chemical—KS051P—an ethylene propylene copolymer having a density of 0.900 and 0.8 MI; Oxychem—LS500—an ethylene octene bimodal copolymer having a density of 0.950 and 0.055 MI; Rexene Chemical—7011—a low density polyethylene having a density of 0.928 and 1.0 MI; and Shell Chemical—1600 SA—polybutylene having a density of 0.910 and 1.7 MI.

The polyolefin resins that are modified by the addition of the additive packages of the present invention are made into degradable/compostable film products, sheet products or foamed planks or sheets.

The additive packages of the present invention are made with at least one metal carboxylate and at least one aliphatic poly hydroxy-carboxyl acid in carrier pellets. In addition the additive packages may include a stabilizer, an oxidizer or calcium oxide which change the triggering of the degradable/compostable reactions under aerobic or anaerobic conditions. The additive packages may use a single additive concentrate or more than one concentrate.

Additive packages of the present invention will be illustrated by making a product, film, from two additive concentrates, one concentrate which contains the metal carboxylate and a second concentrate which contains the aliphatic poly hydroxy-carboxyl acid.

EXAMPLE 1

Additive Package—Cobalt Stearate and Citric Acid

The individual additives, cobalt stearate and citric acid, are individually dried and separately pretreated with 1 to 10 wt % glycerol monostearate, glycerol tristearate or pentaerythritol tetra-stearate in a Henschel mixer.

The dried and treated cobalt stearate (40 wt %) is added to an extruder with Exxon 509 resin (60 wt %). A concentrate of 40 wt % cobalt stearate in 60 wt % Exxon 509 is produced in an extruder operated such that the last zone does not exceed 300° F. and the strands pelletized.

The dried and treated citric acid (10 wt %) is added to an extruder with Eastman 1924 resin (90 wt %). A second concentrate of 10 wt % citric acid in 90 wt % Eastman 1924 is produced in an extruder operated such that the last zone does not exceed 300° F. and the strands pelletized.

Example 1 illustrates the production of two separate concentrates. These two concentrates are combined in Example 2 to illustrate the use of separate concentrates as the additive package of the present invention to produce a degradable/compostable film. Comparative films are made in Example 3 which contain only one of these additive concentrates.

EXAMPLE 2

LDPE Film with—Additive Package—Cobalt Stearate and Citric Acid 4.83 # Eastman 1924 resin,
0.17 # cobalt stearate concentrate (Example 1),
0.02 # citric acid concentrate (Example 1),
are added to the extruder of a melt blowing film line extruder and blown into a film.

EXAMPLE 3

LDPE Film with Additives Separately
a) cobalt stearate
   4.83 # Eastman 1924 resin,
   0.12 # cobalt stearate concentrate (Example 1),
b) citric acid
   4.5 # Eastman 1924 resin,
   1.25 # citric acid concentrate (Example 1),
are added separately to the extruder of a melt blowing film line and blown into a film.

Film samples are taken and tested for degradation. The test for photodegradation (outdoor exposure to sunlight) is to fill bags of the film with grass and set the bags outdoors. The bags are lifted and shaken each day and on the day when the bag breaks, that day is recorded as degraded. The chemical test is to place a piece of the film in a compost pile (ranging from 140° F. to 160° F.). The film is carefully uncovered periodically (intervals of 5, 15, 30 or 90 days). The extent of the degradation is observed and recorded as degraded when portions of the film are not observable. It is observed that the film turns into dust and shows complete molecular breakdown in the compost pile.

TABLE I

|  | Outdoor exposure | Compost |
| --- | --- | --- |
| Example 2 | 11 days | degraded |
| Example 3a | 9 days | not degraded |
| Example 3b | 53 days | not degraded |

This data is significant since the film (Example 2) containing the combination of cobalt stearate and citric acid provided a 20% increase of outdoor life over the film (Example 3a) containing cobalt stearate alone. The importance of this data is that the practical life of a trash bag, for example, which is placed outside awaiting pickup, is not adversely affected by the inclusion of the citric acid; however, the package of cobalt stearate and citric acid provided the only compostable film. The addition of a metal or acid is expected to cause reduction of the physical properties of the thermoplastic; however, the combination has produced results which were totally unexpected. The data shows that the presence of a metal carboxylate provided a prodegradant for photodegradation; however, there was no evidence of degradation in the compost pile, the piece of film remaining intact and no observable physical change. The data shows that the presence of the aliphatic poly hydroxy-carboxyl acid with the metal carboxylate extended the useful life of the packaging product under photodegradation conditions; further, this film was the only film which degraded in the compost pile. The presence of any acid in the production of products such as film is considered undesirable and is usually avoided; however, the production of film with the package of both the metal carboxylate and aliphatic poly hydroxy-carboxyl acids were able to be processed into degradable/compostable film.

Additive packages of the present invention will be illustrated by making a product, film, from a single additive concentrate which contains the metal carboxylate and the aliphatic poly hydroxy-carboxyl acid.

EXAMPLE 4

Additive Package—Cobalt Stearate and Citric Acid

The individual additives, cobalt stearate and citric acid, are individually dried and separately pretreated with 1 to 10 wt % glycerol monostearate, glycerol tristearate or pentaerythritol tetra-stearate in a Henschel mixer.

a) 1/1 ratio of metal to acid

A concentrate of 15 wt % cobalt stearate and 15 wt % citric acid in 70 wt % Exxon 509, is produced in an extruder and the strands pelletized.

b) 3/1 ratio of metal to acid

A concentrate of 22.5 wt % cobalt stearate and 7.5 wt % citric acid in 70 wt % Exxon 509, is produced in an extruder and the strands pelletized.

c) 1/3 ratio of metal to acid

A concentrate of 7.5 wt % cobalt stearate and 22.5 wt % citric acid in 70 wt % Exxon 509, is produced in an extruder and the strands pelletized.

Example 4 illustrates the production of a single concentrate as the additive package of the present invention. These concentrates are incorporated in a polyolefin resin to make a film and the following examples will illustrate the use of these additive packages to produce a degradable/compostable film. The three examples illustrate different levels of concentration of the metal and acid.

EXAMPLE 5

Ethylene-Vinyl Acetate Film with—Additive Package—Cobalt Stearate and Citric Acid 4.89 # Chevron 5272 resin, 0.11 # cobalt stearate/citric acid (1/1) concentrate (Example 4a), are added to the extruder of a melt blowing film line and blown into a film.

EXAMPLE 6

Ethylene-Vinyl Acetate Film with—Additive Package—Cobalt Stearate and Citric Acid 4.89 # Chevron 5272 resin, 0.11 # cobalt stearate/citric acid (3/1) concentrate (Example 4b), are added to the extruder of a melt blowing film line and blown into a film.

EXAMPLE 7

Ethylene-Vinyl Aacetate Film with—Additive Package—Cobalt Stearate and Citric Acid 4.89 # Chevron 5272 resin, 0.11 # cobalt stearate/citric acid (1/3) concentrate (Example 4c), are added to the extruder of a melt blowing film line and blown into a film.

EXAMPLE 8

Ethylene-Vinyl Acetate Film with—Additive Package—Cobalt Stearate, Citric Acid and Calcium Oxide 4.94 # Chevron 5272 resin, 0.16 # cobalt stearate/citric acid (1/3) concentrate (Example 4c), 100 grams calcium oxide are added to the extruder of a melt blowing film line and blown into a film.

The film of Example 7 ran wet, meaning that there were bubbles in the film. In Example 8 the addition of 100 grams of calcium oxide produced a good film, overcoming the processing problem in Example 7. Example 8 illustrates the use of calcium oxide as a processing aid or additive to overcome the problem of bubbles occurring in the film when certain levels of acid are employed in the additive package of the present invention. Examples 7 and 8 have the greatest concentration of acid in the films. It has been found that 10 to 20 wt % of calcium oxide, based on the amount of acid in the film, will overcome the processing problem and no wetting or bubbles will then be present in the film.

TABLE II

|  | Outdoor exposure | Compost |
| --- | --- | --- |
| Example 5 | 40 days | degraded |
| Example 6 | 25 days | degraded |
| Example 7 | 30 days | degraded |
| Example 8 | 50 days | degraded |

The data shows that the presence of the additive package of the present invention results in degradation of all samples in the compost pile. An interesting observation is that the presence of calcium oxide extends the outdoor life of the polyolefin bag. Thus, the use of calcium oxide not only will improve processability but will extend the time for the triggering of the degradation.

Additive packages of the present invention will be illustrated by making a product, film, from additive concentrates which contains other metal carboxylates.

EXAMPLE 9

Additive Package—Cerium Stearate and Citric Acid

The individual additives, cerium stearate and citric acid, are individually dried and separately pretreated with 1 to 10 wt % glycerol monostearate, glycerol tristearate or pentaerythritol tetra-stearate in a Henschel mixer.

The dried and treated cerium stearate (10 wt %) is added to an extruder with Eastman 1924 resin (90 wt %). A concentrate of 10 wt % cerium stearate in 90 wt % Eastman 1924 is produced in an extruder operated such that the last zone does not exceed 300° F. and the strands pelletized.

The dried and treated citric acid (10 wt %) is added to an extruder with Eastman 1924 resin (90 wt %). A second concentrate of 10 wt % citric acid in 90 wt %. Eastman 1924 is produced in an extruder operated such that the last zone does not exceed 300° F. and the strands pelletized.

EXAMPLE 10

LDPE Film with—Additive Package—Cerium Stearate and Citric Acid 4.5 # Eastman 1924 resin, 0.5 # cerium stearate concentrate (Example 9), 0.5 # citric acid concentrate (Example 9), are added to the extruder of a melt blowing film line and blown into a film.

Additive packages of the present invention will be illustrated by making a product, film, from additive concentrates which contains other aliphatic poly hydroxy-carboxyl acids.

EXAMPLE 11

Additive Package—Cobalt Stearate and Fumaric Acid, Malic Acid, Tartaric Acid or Combinations The individual additives, cobalt stearate, fumaric acid, malic acid, and tartaric acid are individually dried and separately pretreated with 1 to 10 wt % glycerol monostearate, glycerol tristearate or pentaerythritol tetra-stearate in a Henschel mixer.

a) cobalt stearate

A concentrate of 40 wt % cobalt stearate in 60 wt % Exxon 509 resin is produced in an extruder and the strands pelletized.

b) fumaric acid

A concentrate of 10 wt % fumaric acid in 90 wt %. Exxon 509 resin is produced in an extruder and the strands pelletized.

c) malic acid

A concentrate of 10 wt % malic acid in 90 wt % Exxon 509 resin is produced in an extruder and the strands pelletized.

d) tartaric acid

A concentrate of 10 wt % tartaric acid in 90 wt % Exxon 509 resin is produced in an extruder and the strands pelletized.

EXAMPLE 12

LDPE Film with—Additive Package—Cobalt Stearate and Fumaric Acid 4.75 # Eastman 1924 resin, 0.70 # cobalt stearate concentrate (Example 11a), 0.70 # fumaric acid concentrate (Example 11b), are added to the extruder of a melt blowing film line and blown into a film.

EXAMPLE 13

LDPE Film with—Additive Package—Cobalt Stearate and Malic Acid 4.75 # Eastman 1924 resin, 0.70 # cobalt stearate concentrate (Example 11a), 0.70 # malic acid concentrate (Example 11c), are added to the extruder of a melt blowing film line and blown into a film.

EXAMPLE 14

LDPE Film with—Additive Package—Cobalt Stearate and Tartaric Acid 4.75 # Eastman 1924 resin, 0.70 # cobalt stearate concentrate (Example 11a), 0.70 # tartaric acid concentrate (Example 11d), are added to the extruder of a melt blowing film line and blown into a film.

TABLE III

|  | Compost |
| --- | --- |
| Example 10 | degraded |
| Example 12 | degraded |
| Example 13 | degraded |
| Example 14 | degraded |

This data shows that different metals and different acids all degraded in a compost pile (range of 140° F. to 160° F.).

The significant conclusion is that the data shows that an additive package comprising a metal carboxylate and an aliphatic poly hydroxy-carboxyl acid will degrade in a compost pile, even under anaerobic condition. The samples will also degrade outside. The triggering of the degradation of the polyolefin films with an additive package of both a metal carboxylate and an aliphatic poly hydroxy-carboxyl acid show that degradation will occur under both outside conditions (photodegradation) and in a compost pile (chemical degradation). The concentrations of the additives may each vary from about 0.01 to about 5 wt %. The greater the amount of metal and acid the quicker the triggering of the degradation reaction in the compost. An additional significant feature is that the chemical degradation occurs in the absence of air or oxygen. The specific application of this phenomenon is to choose an additive package which will provide the desired degradation results for a specific product. The additive package may be modified by choice of the metal carboxylate or by using mixtures thereof, by choice of the aliphatic poly hydroxy-carboxyl acid or by using mixtures thereof and by choice of the polyolefin employed to produce the product. These choices take into account the natural life cycle of the product. By natural life cycle is meant how the product will be packaged for sale to the consumer or customer, how the product will be used and how the product will be disposed of. Since the number of products and their natural life cycles are of such great number, there is no simple, single additive package which fits all situations.

When a specific additive package is prepared for a specific product, the additive packages may be further modified by the addition of either a stabilizer, to extend the time for the triggering of degradation to occur, or an oxidizer, to reduce the triggering time of degradation. In the preparation of the concentrates containing either a stabilizer or oxidizer care is taken to eliminate water either by coating the surface of the additives before introducing them to any extruder, venting the extruder to eliminate water or both. Suitable stabilizers are the diphosphonite component of "SANDOSTAB P-EPQ", a tradename product of Sandoz Chemicals Corporation; tetrakis [methylene(3,5-di-tert-butyl-4-hydroxyhydrocinnamate)]methane, sold by the tradename "IRGANOX 1010", a product of Ciba-Geigy; tris-(3,5,-di-tert-butyl-4-hydroxybenzyl)isocyanurate, sold by the tradename "IRGANOX 3114", a product of Ciba-Geigy; and tris(2,4-di-tert-butyl phenyl)phosphite, sold by the tradename "ARGAFOS 168", a product of Ciba-Geigy and sold by the tradename "MARK 2112", a product of Argus Chemical. Suitable oxidizers are iron oxide, manganese dioxide, cerium hydroxide and perchlorates.

Additive packages of the present invention will be illustrated by making a product, film, from additive concentrates which contain either stabilizers or oxidizers.

EXAMPLE 15

LDPE Film with—Additive Package—Cobalt Stearate and Citric Acid and a Stabilizer 97.86 wt % Rexene 7011 resin, 1.50 wt % cobalt stearate, 0.54 wt % citric acid, and 0.20 wt % PEPQ, are added to the extruder of a melt blowing film line and blown into a film.

EXAMPLE 16

LDPE Film with—Additive Package—Cobalt Stearate and Citric Acid and an Oxidizer 97.86 wt % Rexene 7011 resin, 1.50 wt % cobalt stearate, 0.54 wt % citric acid, and 0.20 wt % manganese dioxide, are added to the extruder of a melt blowing film line and blown into a film.

TABLE IV

| | Compost |
|---|---|
| Example 15 | degrades greater than 20 days |
| Example 16 | degrades less than 10 days |

The presence of a stabilizer or oxidizer effects the length of time for the triggering of the degradation, not whether the degradation will occur. This data shows that polyolefin resins which are stabilized in commercial production are able to be made degradable by the additive packages of the present invention. Only the time of triggering degradation is effected. Also the addition of a stabilizer or oxidizer is an additional tool to control the triggering mechanism of the degradation of the resin besides the choice of additives and concentration of the additives.

The significance of being able to process the thermoplastics containing the additives of the present invention into films should not be overlooked. An importance aspect of the processability of the thermoplastics containing the additives of the present invention is the presence of CaO. This was specifically illustrated in Example 8; however, the addition of CaO also acts as a stabilizer.

The polyolefins which are melt blown into film products and include the additive packages according to the present invention include low density polyethylene (LDPE), very low density polyethylene (VLDPE, less than 0.800 density), linear low density polyethylene (LLDPE), polypropylene, polybutylene and copolymers thereof and copolymers of ethylene such as polyethylene-vinyl acetate (EVA), polyethylene-acrylic acid (ERR), polyethylene-methacrylic acid (EMS) or copolymers of ethylene or propylene with the lower olefins such as, butene-1, pentene-1, hexene or octene. The density of these polyolefin resins range between 0.70 and 0.97. The term "polyethylene resin" as used herein includes any resin where ethylene is predominant and is illustrated by the polyethylene resins in the foregoing list. The copolymer resins usually have a significant amount (over 2 wt %, such as 2–25 wt %) of co-monomer and include the block copolymer resins. One group of polyolefin resins are those which include ethylene or propylene and other olefins such as butene, hexene or octene as co-monomers to produce the copolymers. The term "polyolefin copolymer resin" as used herein includes those polyethylene or polypropylene resins which have at least one other co-monomer.

Another group of polyolefin resins are those copolymers of ethylene with acid monomers which include acrylic acid, methacrylic acid or vinyl acetate which all have the characteristic of highly flexible thermoplastics. These polyolefin resins are referred to herein as "acid resins". It has been found that when the metal carboxylates are included in these acid resins they are compostable similarly as when both metal carboxylates and aliphatic poly hydroxy-carboxyl acid is added to other olefin resins. The amount of aliphatic poly hydroxy-carboxyl acid added to make the package of the present invention may be materially reduced. In fact, these resins when compounded with non-acid resins made the product compostable. Thus, instead of adding an aliphatic poly hydroxy-carboxyl acid as part of the additive package, the addition of an acid resin to a non-acid resin made a degradable/compostable product.

The following examples illustrate use of acid resins as the acid in the additive package of the present invention:

EXAMPLE 17

LDPE Film with—Cobalt Stearate 4.5 # Rexene 7011 resin, and 0.5 # cobalt stearate concentrate (Example 1), are added to the extruder of a melt blowing film line and blown into a film.

EXAMPLE 18

Ethylene-Vinyl Acetate Film with—Cobalt Stearate 4.5 # Chrevon 5272 resin, and 0.5 # cobalt stearate concentrate (Example 1), are added to the extruder of a melt blowing film line and blown into a film.

EXAMPLE 19

Ethylene-Methyl Acrylate and LDPE Film with—Cobalt Stearate 2.25 # Exxon 3001 resin, 2.25 # Exxon Optema TC resin, and 0.5 # cobalt stearate concentrate (Example 1), are added to the extruder of a melt blowing film line and blown into a film.

Samples of Examples 17, 18 and 19 are placed into a compost pile. No degradation is observed in the sample of Example 17; whereas, the samples from Examples 18 and 19 degrade. The samples of Examples 18 and 19 include acid resins; whereas, the sample of Example 17 has no acid. Example 19 illustrates that an acid resin added to a non-acid resin will result in a product which is compostable.

Additive packages of the present invention will be illustrated by making products other than film; namely, planks or sheets, packaging materials used as protective barriers.

EXAMPLE 20

LDPE Foamed Planks with—Additive Package—Cobalt Stearate and Citric Acid—Calcium Carbonate to Nucleate the Pentane Gas 61 wt % Exxon 509 resin, 6 wt % cobalt stearate concentrate (Example 1), 3 wt % citric a,id concentrate (Example 1), and 30 wt % calcium carbonate are added as a concentrate to the extruder of a foam tubing line at a let down ratio of 30/1 with Rexene 7011 resin, using pentane gas as the chemical foaming agent. The extruded foamed tubing formed is slit open into a foamed plank or sheet.

EXAMPLE 21

LDPE Foamed Planks with—Additive Package—Cobalt Stearate and Citric Acid 60.4 wt % Exxon 509 resin, 6.0 wt % cobalt stearate concentrate (Example 1), 3.0 wt % citric acid concentrate (Example 1), 0.6 wt % calcium oxide, and 30.0 wt % calcium carbonate are added as a concentrate to the extruder of a foam tubing line at a let down ratio of 30/1 with Rexene 7011 resin, using pentane gas as the chemical foaming agent. The extruded foamed tubing formed is slit open into a foamed plank or sheet.

Samples of Examples 20 and 21 are placed into a compost pile. Degradation is observed in both samples.

We claim:

1. A degradable/compostable additive package for polyolefin resins which consists essentially of low melting polyolefin containing cobalt stearate and citric acid.

2. A degradable/compostable additive package for polyolefin resins which comprises low melting polyolefin, cobalt stearate, citric acid and calcium oxide.

3. An additive package according to claim 1 which further contains at least one compound selected from the group consisting of stabilizers and oxidizers.

4. A degradable/compostable additive package for polyolefin resins which contains pellets of low melting polyolefin containing 10 to 40 wt % of pretreated metal carboxylate;

pellets of low melting polyolefin containing 10 wt % of pretreated aliphatic poly hydroxy-carboxyl acid.

5. A degradable/compostable additive package for polyolefin resins which consists essentially of pellets of low melting polyolefin containing 40 wt % of pretreated metal carboxylate; and pellets of a copolymer of ethylene with acid monomers.

6. An additive package according to claim 4 which further contains calcium oxide in an amount equal to between 10 and 20 wt % of the amount of said acid.

7. A degradable/compostable additive package for polyolefin resins which contains pellets of low melting polyolefin containing 7.5 to 22.5 wt % of pretreated metal carboxylate, 7.5 to 22.5 wt % of pretreated aliphatic poly hydroxy-carboxyl acid, the amount of carboxylate and acid totaling 30 wt %.

8. A process for making a packaging material from a polyolefin resin which comprises:

introducing into an extruder said polyolefin resin;

introducing said additive package of claim 1 and forming a product.

9. A process according to claim 8 which further includes:

introducing calcium oxide with said resin to make said combined materials processable.

10. A process according to claim 8 wherein said product is a film.

11. A process according to claim 8 wherein said product is a foamed plank.

12. A degradable/compostable product comprising a film of a polyolefin resin having a thickness of 2 to 10 mil containing the additive package of claim 5.

13. A degradable/compostable product comprising a foamed plank of a polyolefin resin containing the additive package of claim 5.

14. A process for producing a concentrate for producing degradable/compostable polyolefin products which comprises:

treating a metal carboxylate and poly hydroxy-carboxyl acid to remove water; introducing said metal carboxylate and said acid with a low melting polyolefin into an extruder;

extruding strands of the polyolefin containing said metal carboxylate and said acid at exit zone temperatures less than 300° F.; and pelletizing said strands into pellets of polyolefin containing said metal carboxylate and said acid.

15. A process according to claim 14 wherein said metal carboxylate is cobalt stearate.

16. A process according to claims 14 wherein said acid is citric acid.

17. A degradable/compostable additive package for polyolefin resins which consists essentially of copolymers of ethylene with acid monomers, cobalt stearate and an aliphatic poly hydroxy-carboxyl acid.

18. An additive package according to claim 17 wherein said acid is citric acid.

19. An additive package according to claim 17 wherein said package further contains at least one compound selected from the group consisting of stabilizers and oxidizers.

20. An additive package according to claim 17 which further contains calcium oxide.

21. A degradable/compostable additive package according to claim 5 which further contains pellets of low melting polyolefin containing aliphatic pole hydroxy-carboxyl acid.

22. An additive package according to claim 21 wherein said acid is citric acid.

23. A degradable/compostable additive package according to claim 8 which further contains calcium oxide in an amount equal to between 10 and 20 wt % of the amount cf said acid.

24. A degradable/compostable additive package for polyolefin resins which consists essentially of low melting polyolefin containing 1.5 wt % of cobalt stearate, 0.5 wt % of citric acid and 0.2 wt % of a stabilizer.

25. A degradable/compostable additive package according to claim 24 wherein said stabilizer is selected from the group consisting of diphosphonite, tetrakis [methylene (3,5-di-tert-butyl-4-hydroxyhydrocinnamate)]methane, tris-(3,5-di-tert-butyl4-hydroxybenzyl) isocyanurate, and tris(2,4-di-tert-butylphenyl) phosphite.

26. A degradable/compostable additive package for polyolefin resin which contains low melting polyolefin containing 1.5 wt % of metal carboxylate, 0.5 wt % of citric acid and 0.2 wt % of an oxidizer.

* * * * *